No. 699,227. Patented May 6, 1902.
W. H. OSBURN.
COW TAIL HOLDER.
(Application filed July 6, 1901.)

(No Model.)

Witnesses
Fred J. Hartman.
L. H. Momson

Inventor
William H. Osburn.
By Attorney
W. Preston Williamson.

UNITED STATES PATENT OFFICE.

WILLIAM H. OSBURN, OF KOKOMO, INDIANA.

COW-TAIL HOLDER.

SPECIFICATION forming part of Letters Patent No. 699,227, dated May 6, 1902.

Application filed July 6, 1901. Serial No. 67,349. (No model.)

*To all whom it may concern:*

Be it known that I, WILLIAM H. OSBURN, a citizen of the United States, residing at Kokomo, county of Howard, and State of Indiana, have invented a certain new and useful Improvement in Tail-Holders, of which the following is a specification.

My invention relates to a new and useful attachment for holding the tail of a cow while being milked, and has for its object to provide an apparatus of this description which may be easily attached or detached from the cow and will allow the cow to switch her tail to a certain extent, but will not allow her to throw it sidewise, so as to interfere with the person doing the milking.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
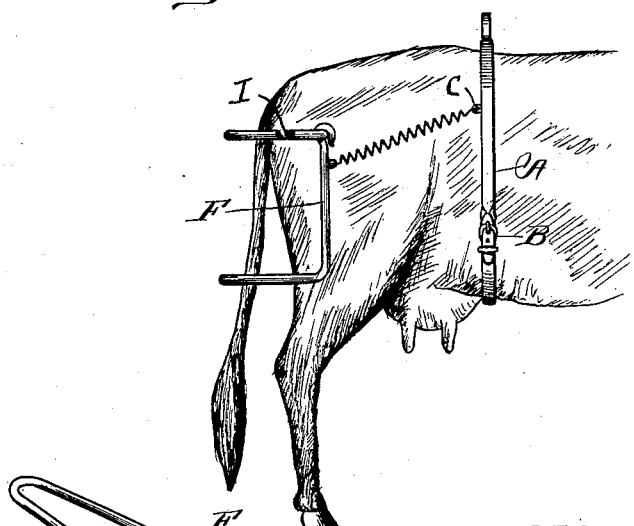
Figure 2:
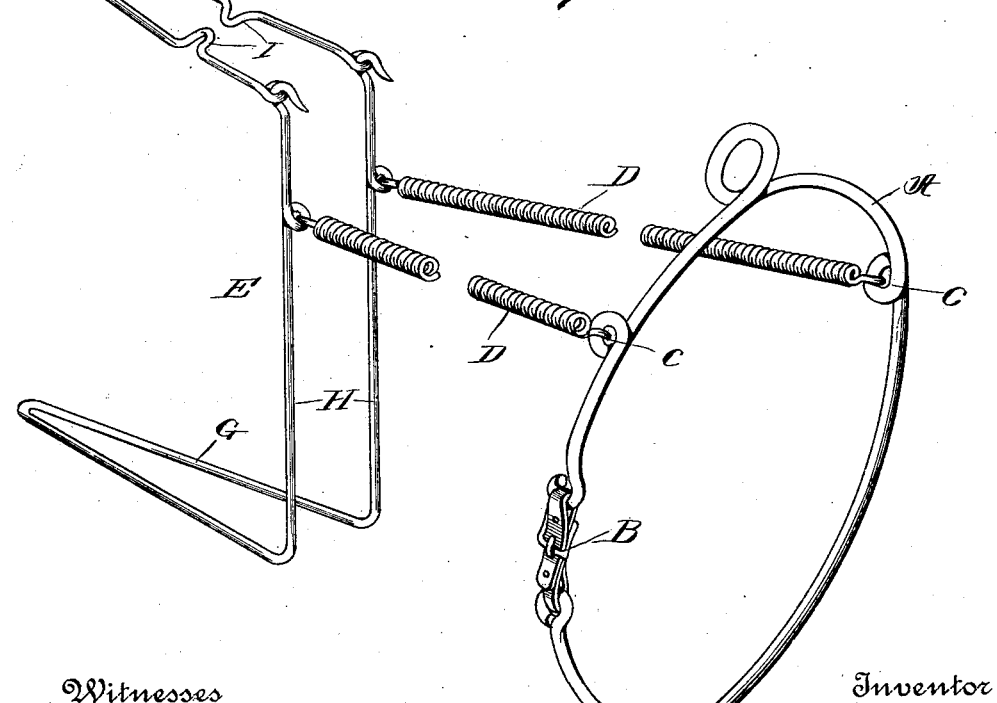

Figure 1 is a side elevation of my invention attached to a cow, and Fig. 2 is a perspective view of my attachment.

In carrying out my invention as here embodied A represents a metallic band which is to be placed around the body of a cow and is secured in any suitable manner, here shown as a strap and buckle B. Upon each side of the band A eyelets C are formed, to which is attached the ends of springs D. The other ends of the springs are attached to a wire framework E, which is designed to be clasped around the tail of the cow. This framework of wire is bent so as to form the V-shaped portions F and G, these V-shaped portions being connected together by the bars H, to which the springs D are attached. This framework is adapted to embrace the rear portion of the animal's body and is adapted to be spread sufficiently to allow for this. The upper V-shaped portion F is bent inward upon each side at the point I, and these bent-in portions will form shoulders which are adapted to rest against the hind quarters of the cow. The attachment E is adapted to be placed over the tail, so that the tail will lie within the V-shaped portions F and G, and the shoulders I will prevent the springs drawing the attachment too close to the hind quarters of the cow to confine the tail. The V-shaped portions F and G are made sufficiently long enough to allow the tail a certain amount of movement lengthwise, but will prevent the tail from being switched around to the side.

The band A, which passes around the body of the cow, may be either made of wire, such as shown in Fig. 2, or may be a metallic band, such as shown in Fig. 1.

The advantage of my invention is that this appliance having only one fastening can be readily attached and detached from the cow and when attached will allow the cow a certain amount of movement with her tail, but prevent the same from being switched sidewise to annoy the milker, and a further advantage of my improvement is that by the use of the springs D the holder E will not hold the tail rigidly, but will give slightly upon any unusual movement of the tail and will also provide for its adjustment to any size of cow.

Of course I do not wish to be limited to the exact construction here shown, as slight modifications could be made without departing from the spirit of my invention.

Having thus fully described my invention, what I claim as new and useful is—

1. In a device of the character described, a framework designed to hold the tail of a cow, consisting of wire bent so as to form V-shaped portions F and G, bent-in portions I formed in the upper V-shaped portion, bars H connecting the two V-shaped portions, springs secured to said bars, and means for attaching said springs to the body of the cow, substantially as described and for the purpose specified.

2. In a tail-holder attachment for cows, a forked framework adapted to embrace the tail, portions of said framework bent inward so as to rest against the hind quarters of the cow, springs, one end of which are attached to said framework, a band adapted to encircle the body of the cow, the other end of said springs attached to said band, substantially as described and for the purpose specified.

3. In a device of the character described, two V-shaped portions, vertically-disposed bars connecting said portions, shoulders formed on the upper portion, a band for embracing the body of the animal, and springs connecting the bars and band, as and for the purpose described.

In testimony whereof I have hereunto affixed my signature in the presence of two subscribing witnesses.

WILLIAM H. OSBURN.

Witnesses:
ROSS TORRENCE,
J. J. TORRENCE.